United States Patent [19]

Nash

[11] Patent Number: 5,620,773

[45] Date of Patent: Apr. 15, 1997

US005620773A

[54] COMPOSITION AND METHOD FOR TEXTURING THE SURFACE OF GLOVES

[75] Inventor: Brian Nash, Carpinteria, Calif.

[73] Assignee: Mcghan Nusil Corporation, Carpinteria, Calif.

[21] Appl. No.: 605,647

[22] Filed: Feb. 22, 1996

Related U.S. Application Data

[63] Continuation-in-part of Ser. No. 995,323, Dec. 22, 1992, abandoned, which is a continuation of Ser. No. 794,292, Oct. 25, 1991, abandoned, which is a continuation-in-part of Ser. No. 483,550, Feb. 21, 1990, abandoned.

[51] Int. Cl.$^6$ ........................................................ B32B 5/14
[52] U.S. Cl. ........................ 428/145; 428/141; 428/143; 428/447; 524/860; 2/161.7; 2/168; 2/169; 264/236; 264/255; 264/305
[58] Field of Search ................................ 428/141, 143, 428/145, 447; 524/860; 2/161.7, 168, 169; 264/236, 255, 305

[56] References Cited

U.S. PATENT DOCUMENTS

| | | | |
|---|---|---|---|
| 1,983,963 | 12/1934 | Belton | 18/58 |
| 4,061,709 | 12/1977 | Miller et al. | 264/293 |
| 4,087,399 | 5/1978 | Hamada et al. | 524/106 |
| 4,143,109 | 3/1979 | Stockum | 264/112 |
| 4,552,713 | 11/1985 | Cavicchioli | 264/162 |
| 4,554,187 | 11/1985 | Grape et al. | 427/387 |
| 4,555,560 | 11/1985 | Saruyama et al. | 524/860 |
| 4,560,711 | 12/1985 | Suzuki | 523/212 |
| 4,569,980 | 2/1986 | Sasaki et al. | 528/14 |
| 4,634,733 | 1/1987 | Bauman et al. | 524/860 |
| 4,677,160 | 6/1987 | Kondo et al. | 524/860 |
| 4,950,502 | 8/1990 | Saam et al. | 427/213.36 |
| 4,954,565 | 9/1990 | Liles | 524/869 |
| 4,956,436 | 9/1990 | Letoffe et al. | 524/860 |
| 5,089,205 | 2/1992 | Huang et al. | 264/255 |
| 5,284,607 | 2/1994 | Chen | 264/37 |
| 5,314,653 | 5/1994 | Haralampopoulos | 264/301 |

*Primary Examiner*—Margaret W. Glass
*Attorney, Agent, or Firm*—Michael G. Petit

[57] ABSTRACT

Novel one and two-part silicone dispersions are described which are suitable for applying a durable textured silicone surface on both silicone and non-silicone gloves. The non-blocking surface is obtained by dip-coating a final layer of dispersion over an article wherein the dispersion used for the final layer comprises a unique hydrophilic silica filler having a specific surface area of about 75–200 $M^2$ per gram, at least one crosslinkable polysiloxane and a crosslinking agent. The silica particles, securely imbedded within the final layer of silicone with portions thereof extending outwardly beyond the new outer silicone surface of the gloves, present a non-blocking, non-allergenic textured surface.

1 Claim, No Drawings

COMPOSITION AND METHOD FOR TEXTURING THE SURFACE OF GLOVES

CROSS REFERENCE TO RELATED APPLICATIONS

This is a continuation-in-part of application Ser. No. 07/995,323, filed Dec. 22, 1992, now abandoned, which is a continuation of application Ser. No. 07/794,292 filed Oct. 25, 1991, now abandoned, which is a continuation-in-part of application Ser. No. 07/483,550; filed Feb. 21, 1990, now abandoned.

BACKGROUND OF THE INVENTION

1. Field of the Invention

This invention relates to a composition and method for making a silicone article that has a textured non-blocking surface.

2. Prior Art

As is well known in the art, silicone articles may be formed by dipping or otherwise depositing a dispersion of silicone on an appropriate form. The dispersion may also contain a vulcanizing agent along with accelerators and other additives. After each layer of dispersion is deposited on the form, the layer is permitted to cure and the process is repeated until the outer shell of the article reaches the required thickness.

A smooth untreated elastomer surface has the physical characteristic of blocking; that is, the characteristic of sticking to itself and other surfaces. For some applications blocking is undesirable. For example, blocking is undesirable in latex, silicone and other elastomer gloves because it makes them difficult to don. Various lubricants and release agents have been dusted or otherwise applied to gloves to improve performance and overcome blocking. The shedding of these lubricants can cause undesirable side-effects, such as contamination, infection and foreign body reactions due to powders from gloves entering the wound during surgical procedures. As a result, much of the early work on textured surfaces was performed on latex surgical gloves. U.S. Pat. No. 3,761,965, discloses a sanitary glove having a textured surface provided by a granular vinyl chloride polymer imbedded on the surface of the film from which the glove is manufactured. This glove is suitable for donning without the use of a lubricant such as powder. However, this type of glove has the same type of problem as talc-dusted gloves in that particulates may enter a wound causing an adverse foreign body reaction. Dusted gloves are, therefore, not generally suitable for surgical procedures.

U.S. Pat. No. 1,983,963 discloses a method of providing a textured surface on a rubber glove which subjects the vulcanized surface of the glove to the action of a rubber solvent or swelling agent such as naphtha, benzol or gasoline either by immersion or by subjecting the surfaces to the fumes of these chemicals. This process, which is similar to etching, has not enjoyed widespread use and is not adaptable to silicone.

U.S. Pat. No. 4,143,109, issued to Stockum, describes a method of dip-coating a first layer of natural rubber latex onto a glove form, the form having the general contour of a human hand, followed by dip-coating a second layer containing particulates which are randomly distributed throughout the dispersion. After curing, the glove is inverted and may be donned without the use of lubricants. The general method developed by Stockum for latex articles has not been transferable to silicone articles because the particulates taught by Stockum for use with latex would weaken the outermost layers of silicone substantially.

The foregoing inventions have been developed for latex articles. U.S. Pat. No. 4,061,709 to Miller, et al, describes a method for manufacturing silicone rubber gloves with a non-blocking surface by repeatedly dipping a form in a solvent dispersion of uncured silicone rubber to build up a plurality of layers and then forming a layer of liquid droplets on the surface of the article thereby forming an irregular or textured surface as the solvent evaporates. Utilization of this method for physically altering the exterior uniformly from lot to lot requires a highly controlled manufacturing environment which is difficult and expensive to maintain. The present invention utilizes a unique dispersion which produces a uniformly textured non-blocking surface.

There are other areas where a non-organic, non-contaminating, non-blocking, non-allergenic, texturized surface with low reflectivity and high diffusivity would be highly advantageous. Some space applications demand low reflectivity or high diffusivity in paints and coatings. Epoxies, and almost all organic coatings other than silicone, are not durable enough to withstand the highly oxidizing atmospheres that satellites must endure. For example, an anti-blocking silicone surface is necessary in a bellows or in a rolled solar array to facilitate separation of adjacent surfaces during deployment. Until now, prior art silicone technology has not been able to produce contaminant-free silicone anti-blocking, low-reflectivity, high diffusivity outer layers which are sufficiently durable to withstand the physical and chemical properties of these extreme environments.

SUMMARY OF THE PRESENT INVENTION

The invention generally contemplates providing a new and improved composition and process which enables both silicone and non-silicone articles to be coated with silicone and textured in situ. Texturizing is brought about by the incorporation of hydrophilic silica in a silicone dispersion used for a final coating or texturizing dip. In the final dispersion of the dipping process, the silica particles are incorporated within the outermost layer and stand up away from the surface providing a textured unblocking surface, while, at the same time, not substantially weakening the article or permitting delamination of the textured final layer.

It is an object of the invention to provide a composition for making a silicone article having an integral textured non-blocking outer surface, which surface is formed in situ; and to provide a method for making the same.

It is yet another object of this invention to provide a composition and method useful for applying a textured silicone coating to both silicone and non-silicone articles.

It is yet a further object of the invention to provide a composition for applying a contaminant-free outer surface to an article.

It is still a further object of the invention to provide a composition for applying a textured, non-allergenic outer surface to an article.

DESCRIPTION OF PREFERRED EMBODIMENTS

This invention teaches the addition of hydrophilic silica preferably in the size range of 2–10 microns, to elastomer dispersion to provide a textured non-blocking silicone surface coating on articles dipped therein. Dipping articles in elastomer dispersions is well known in the art of applying elastomer coatings. Suitable silicone dispersions for applying smooth, non-textured coatings to articles are also well known in the art. What has been unknown in the art until the invention thereof by the present inventor is the addition of hydrophilic silica to a silicone dispersion to render a textured surface to articles coated therewith.

The addition of colloidal silica to elastomer dispersions is also well known in the art. The function of added colloidal silica is to strengthen the elastomer upon curing. Colloidal silica, which is hydrophobic (organophilic), is obtained by the surface treatment of silica with organic moieties to generate a particulate species capable of colloidal dispersion. While the addition of colloidal silica to a silicone dispersion strengthens the resultant elastomer layer, the dispersion is inoperative for providing a textured surface to an article coated therewith. Surprisingly, adding hydrophilic silica, preferably in the size range 2–10 microns, to a dispersion does provide a textured surface to an article coated therewith. Colloidal silica is too dense for the particles to "float" to the surface while the layer is curing. It is important that the silica particles have a large specific surface area and a density such that the hydrophilic silica particles "float" in an elastomer dispersion thereby migrating to the surface of a layer coated with such a dispersion.

The above-described dispersion is particularly useful for texturing the inner surface of silicone gloves. In glove manufacture, a hand-shaped mandril is repeatedly dipped into an elastomeric dispersion, cured and peeled off the mandril. Thus, the outer surface becomes the inside of the glove when the glove is removed from the mandril. That is, the glove is inverted during removal. Thus, if a textured mandril is used, the outer surface of the glove is textured when removed from the mandril. The dispersion described above provides a textured outer surface to the coating which surface becomes the inner surface when the glove is peeled from the mandril. Such a textured inner surface is non-blocking and no lubricant is required to don the glove.

A hand-shaped glove having a textured silicone inner surface made by the process of: (a) forming an uncured coating of a dispersion upon the surface of a hand-shaped mandrel, the dispersion comprising silicone elastomer dispersed in an organic solvent to which dispersion hydrophilic silica has been added. The hydrophilic silica to accumulates on the outer surface of the uncured coating of dispersion. Upon curing the outer coating of dispersion a textured outer surface is formed on the hand shaped glove. The hand-shaped glove is then peeled from the mandrel thereby everting the glove, whereby the cured coating provides a textured inner surface for the hand-shaped glove.

EXAMPLE 1

FIRST PREFERRED EMBODIMENT

The present invention is directed to the task of improving the surface morphology of articles, including silicone articles, to provide a textured surface which has a lower coefficient of friction than a smooth surface and which is suitable for coating articles such as surgical gloves which presently require lubricants to enable donning.

In accordance with the invention, the surface morphology of articles is substantially improved by bonding to the surface a silicone coating comprising the reaction product of a composition comprising:

(1) at least one crosslinkable polysiloxane; (2) silica filler; (3) crosslinking catalyst; and (4) a crosslinking agent.

The coating may be applied to the surface from a liquid vehicle, preferably a volatile organic solvent, followed by heating to drive off the organic solvent or other liquid vehicle and to effect crosslinking. The manner of application, whether by dipping, flowing, spraying, etc. is a matter of individual choice and per se comprises no part of this invention.

An example of a two-part silicone dispersion which, when combined and applied to the surface of an article, and allowed to cure, produces a durable textured, non-blocking surface on said article, is as follows:

|  | Part A % by weight | Part B % by weight |
| --- | --- | --- |
| Trifluoropropyl methyl polysiloxane | 0%–100% | 0%–100% |
| Dimethyl polysiloxane | 0%–100% | 9%–100% |
| Dimethyl diphenyl polysiloxane | 0%–30% | 30%–0% |
| Catalyst | 0–20 ppm | 0 |
| X linker | 0 | 0–10% |
| hydrophilic silica | 1–20% | 1–20% |
| Reinforcing silica | 0–40% | 0–40% | in an organic solvent.

The coating composition of this invention is readily prepared by mixing the ingredients under ambient temperature and pressure. The surface may be coated by per se known techniques, dipping in the coating solution being more efficacious.

Crosslinking as well as solvent removal is effected by heating at a temperature and for a time to effect complete cure as well as solvent removal. Since there is a time-temperature relationship to effect cure, the time and temperature are not susceptible to precise quantitative statements. On a bench scale, heating at about 150° C. for about 30 minutes is effective.

EXAMPLE 2

SECOND PREFERRED EMBODIMENT

A second system which is suitable for using as a final coat dispersion for producing textured surfaces on silicone and non-silicone articles is a one-part system similar to the two-part system described in Example 1. The one-part system utilizes for example, dimethyl polysiloxane (0–100%), Dimethyl diphenyl polysiloxane (30–0%), hydrophilic silica having a specific surface area between 75–200 square meters per gram (0–20%), tris (methylethyl ketoximo) methylsilane (<10%) and a catalyst (organo-tin complex) in naptha. Before the above dispersion is suitable for a final application, the percentage of of texturizing silica (e.g. Degussa TS-100) must be adjusted to fall within the range of about 0–20% by solids weight. Solvent for the final dilution runs from 0–70% by solids weight.

What I claim is:

1. A hand-shaped glove having a textured inner surface made by the process of: (a) presenting a hand-shaped mandrel and forming an uncured coating of a fluid silicone elastomer dispersion upon an outer surface of the hand-shaped-mandrel, the fluid silicone elastomer dispersion comprising silicone elastomer and hydrophilic silica particles dispersed in an organic solvent, and allowing said hydrophilic silica particles to accumulate on and project above the outer surface of the uncured coating to form a textured outer surface of a hand shaped glove; and (b) curing the uncured coating to form a cured coating; and (c) everting said hand-shaped glove, the cured coating forming a textured inner surface of the hand-shaped glove.

* * * * *